Dec. 5, 1950     E. R. SAWTELLE     2,532,733
LAWN MOWER
Filed Aug. 23, 1946
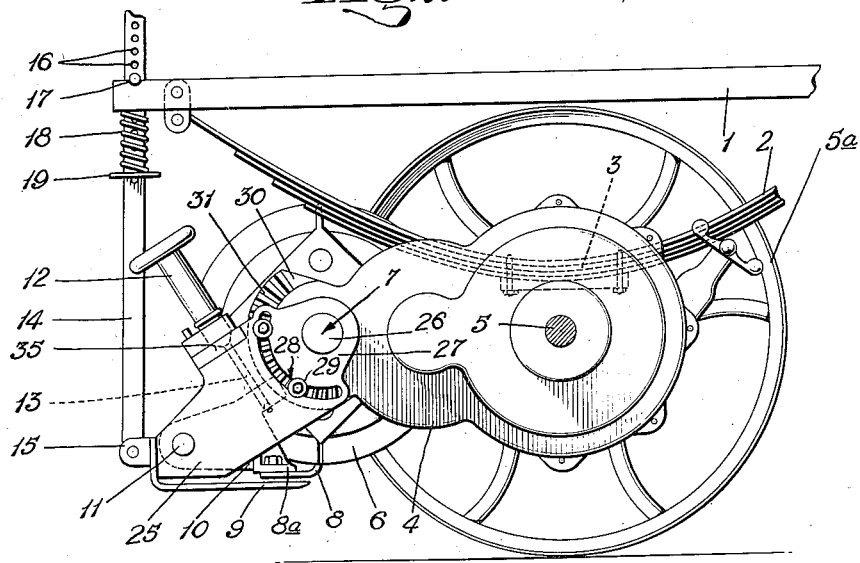
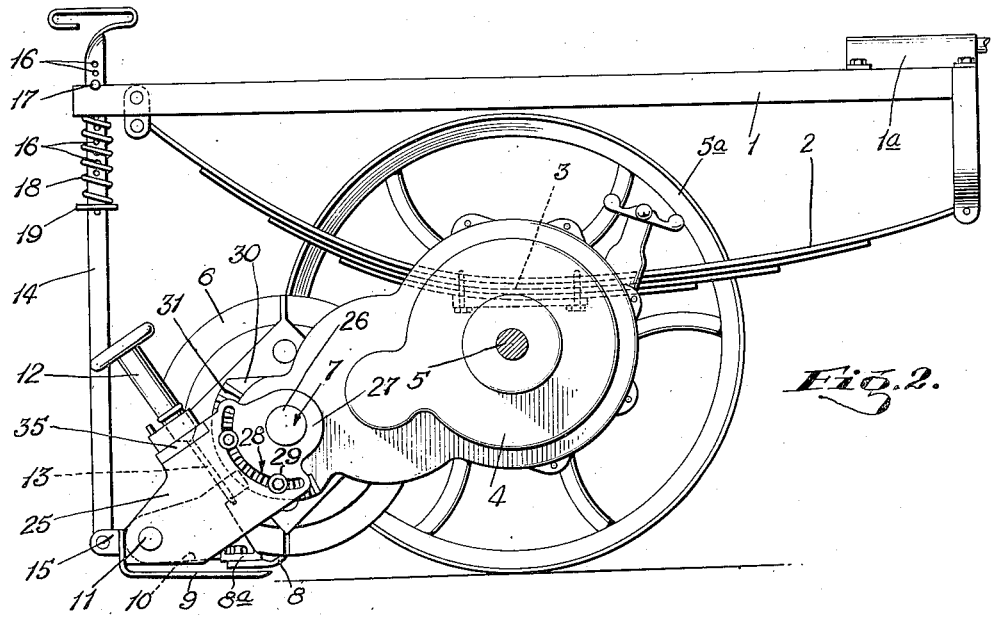
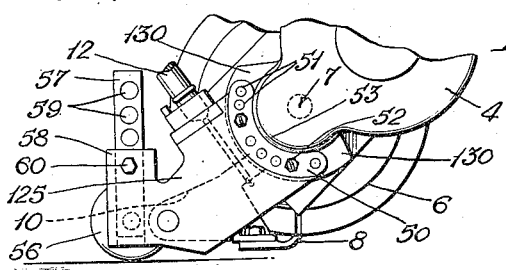
INVENTOR
EDMUND R. SAWTELLE
ATTORNEY Patented Dec. 5, 1950

2,532,733

UNITED STATES PATENT OFFICE 2,532,733

LAWN MOWER

Edmund Rossiter Sawtelle, Shawnee-on-Delaware, Pa., assignor to Worthington Mower Company, Stroudsburg, Pa., a corporation of Delaware Application August 23, 1946, Serial No. 692,445

2 Claims. (Cl. 56—249)

This invention relates to lawn mowers, and especially to the mounting of the bed knives of mowers.

Heretofore it had been the practice to pivot the bed knives of lawn mowers at one side of the reels so that their cutting edges can be moved more or less radially of the reels below the reels. The purpose of such pivoting is, of course, to provide for adjustments to compensate for wear of the knife and the blades of the reels. Conventionally the pivots of the bed knife, and also the mechanism that swings the knife on its pivots when adjustment is necessary, are mounted in a fixed relation to the reels, e. g. are mounted on the gear housings in which the reels are journalled. Conventionally too the attachments for the ground rolls or other devices that fix the heights of the reels above the ground when cutting, are connected to the same housings or their covers.

This practice requires manufacturers building mowers for cutting grass at a number of different heights (for example machines for cutting as short as three-fourths of an inch and other machines for cutting to five or six inches, and still other machines for cutting to intermediate lengths), to make and carry in stock a number of machine parts, for example gear housings or housing facings, which differ among themselves, speaking generally, only with respect to the provisions made for receiving the pivots that support the bed knives and for receiving the mechanisms by which the positions of the knives are adjusted to compensate for wear. These parts need to differ among themselves in these respects of course, where the practices prior to my invention are followed, because effective cutting requires the cutting edge of the bed knife to be located within rather small limits with respect to the vertical plane passing through the reel axis, and this in turn requires different placements of the knife for high cuts, low cuts and intermediate cuts. Also for the same reason it has not been practical heretofore for a user of mowers to use one and the same machine for cutting grass throughout a considerable range of heights, even if the machine is so constructed or can be so modified as to permit the raising and lowering of the reel and knife the requisite distances.

All the foregoing are well known and have been recognized before.

The present invention overcomes these faults of prior practices. That is to say, it permits identical mower parts to be used for assembling mowers designed to cut at various heights throughout substantially any range. It thus simplifies manufacture by requiring the manufacture and the stocking up of a smaller number of machine parts, and accordingly reduces costs. Further, it permits one and the same mower to be used for cutting high at one time and low at another time, and at intermediate positions at other times, providing that, additionally, the mower is so designed or modifiable that its reel can be operated at various distances from the ground throughout the desired range of heights.

Briefly I accomplish these results by mounting the bed knife for arcuate adjustment around the axis of the reel. Preferably both the knife and its position-adjusting mechanism to compensate for wear are mounted on a common bracket (or, say, pair of brackets) which has (or have) a broad face held in a selected position of juxtaposition with the broad face of a side member by fastening means for adjustment around the axis of the reel as a center. This last permits the knife and its wear-adjusting mechanism to be moved as a unit whenever a height adjustment is made, and moved without changing either their relative positions, or their individual positions relative to the reel except circumferentially. The device whereby the reel is held at the desired distance from the ground (which, as before, may be, for example, either a ground roller or a hanger), may be connected to the gear housing, for example substantially as heretofore, or it may be connected, for example, to the brackets or the like to which the bed knife is directly affixed. I prefer however to connect it to the bracket or brackets by which the bed knife is mounted for arcuate adjustment around the reel axis.

The invention can be applied to individual mowers and also to units of gang mowers, and to mowers in which the reels are driven by motors as well as to mowers in which the reels are revolved by ground wheels, etc. In general the invention is of general application to heavy duty mowers of the horizontally revolving reel type.

The accompanying drawings illustrate a preferred form of my invention applied to a certain standard form of gang mower. Fig. 1 is an elevation of one side of one of the mower units, the near ground wheel being removed. Fig. 2 is a view similar to Fig. 1 but showing the mechanism adjusted for cutting the grass to a much shorter length. Fig. 3 illustrates a modification of a detail.

In the gang unit of the drawing, a draft frame 1, say rectangular in shape and carrying a hitch 1a connecting it to a tractor or to another unit of the gang, is mounted on a pair of leaf springs 2, one at each side of the mower. These springs are mounted at 3 upon the axle 5 on which the ground wheels 5a of the mower unit are mounted as conventional, and also as customary one end of each of the two side members of the mower, such as the gear cases 4 of the machine, is mounted on, but is free to turn about, the axle 5. The gear cases 4 may be fastened to each other by the usual tie rods, not shown in the drawings. Near their rear ends the gear cases 4 carry between them a conventional fly knife reel 6, the axis of the shaft of which is indicated at 7; in the present instance the reel 6 is rotated by the ground wheels 5a acting through gears in the gear cases 4 in, say, a conventional manner. Placed generally below the reel 6 is a conventional bed knife 8 that cooperates with the knives of the reel 6 to cut the grass. Below the bed knife 8 a ground plate 9 is provided to guard the knife from stones, hummocks, etc., as is customary when no roller is used to hold the reel and knife elevated from the ground. As heretofore the bed knife 8 may be attached to a bed knife backing 8a, so called, which is integral with or mounted on brackets 10. There may be, say, one of these brackets 10 adjacent each gear case 4. Also the ground plate 9 may be mounted on the brackets 10 (or the unit composed of the brackets 10 and the bed knife backing 8a), but to prevent blows on the skid or ground plate 9 affecting the setting of the knife 8, I prefer to mount the plate 9 otherwise as explained hereafter. The brackets 10 may be hinged at 11 at one side of the reel and be supported adjustably at their opposite ends by conventional nuts 12 and cooperating threaded links 13; the nuts may be provided with finger grips for ready manipulation as heretofore and as indicated. The brackets 10, hand nuts 12 and links 13 serve to hold the knife 8 to the reel 6 and provide for the adjustment of the knife toward the reel substantially radially to compensate for wear, all as usual heretofore, speaking generally.

In the absence of a ground roller, the rear ends of the gear cases 4 are supported in the present instance, and the reel 6 and knife 8 are held at such distances above the ground as may be necessary for the length of grass desired, by a hanger or rod 14 that is suspended by the frame 1 and hitched at 15 to a cross member fastened to the rear ends of the two gear cases 4. As illustrated this cross member may be the ground plate 9. The suspending mechanism can be adjustable in length if desired; for example the rod 14 may be pierced with a number of holes 16 and provided with a pin 17 that can be placed in any one of these holes and rested on the top of frame 1. A spiral compression spring 18, acting between the frame 1 and a shoulder or cross pin 19 on rod 14, serves to restrain somewhat the upward movement of the rear ends of the gear cases and the reel and knife, as is customary, speaking generally.

In accordance with the present invention however, the rod 14 is long enough and provided with sufficient holes 16 to hold the reel for cutting close to the ground (Fig. 2), and also high for cutting much higher (Fig. 1), and also for cutting at various intermediate heights. Also each of the brackets 10 is mounted, by its pivot 11, in a bracket 25 that is arcuately adjustable about the axis at 7 of the reel 6, and preferably any skid or ground plate 9 employed is mounted on these brackets 25 also. In the present instance one face of each gear case 4 is provided with a circular projecting boss 26 providing a broad arcuate face having the reel axis 7 as its center, and the adjacent bracket 25 has a portion 27 more or less encircling this boss but sufficiently loose on the boss to permit the bracket to be turned on the boss. An elongated arcuate slot 28 in each bracket, having the axis 7 as its center of curvature, and bolts 29 passing through the slot and, say, having heads to engage the face of the bracket at the sides of the slot and threaded into the adjacent gear case 4 or into a flange 30 projecting from the end of the gear case, provide for locking the brackets to the gear casings at various angular positions around the axis 7 with the knife 8 below the reel 6, and provide also for changing the positions of these parts, angularly around the axis 7, from time to time. Interengaging serrations 31 in the mutually engaging faces of the brackets 25 and the gear cases or flanges 30 can be used to assist the bolts in holding the brackets firmly in their various positions. By means of the brackets 25 therefore, the bed knife 8 can be placed in various positions below the reel 6; or more specifically, can be placed substantially at the vertical plane passing through the axis 7 of the reel (or at any other position with respect to that plane that may be desired) regardless of whether the reel is placed for cutting well above the ground (for example six inches above), or near to the ground (say three-fourths of an inch above the ground), or at various intermediate positions.

Also in accordance with the preference previously expressed, the mechanisms by which the brackets 10 are swung to advance the knife 8 to the reel 6 to compensate for wear, are arranged to act between these brackets 10 and the respective arcuate brackets 25 by which they are carried. To this end each nut 12 is mounted on the adjacent arcuate bracket 25 substantially as such nuts have been mounted on the gear cases heretofore, and each link 13 is hooked onto the respective bracket 10 substantially as heretofore. In the present instance the hand nuts 12 rest on flanges 35 which extend from the inner faces of the arcuate brackets 25 as it were, and the links 13 lie substantially at the inner faces of the brackets 25. Should other forms of mechanisms be used to adjust the knife radially with respect to the reel, such mechanisms can be similarly positioned as will be obvious.

Also in accordance with a further preference expressed above, the hitch or connection 15 by which the rear ends of the gear cases 4 and the reel 6 are held elevated, is connected to the brackets 25 rather than directly to the gear case 4. I prefer this arrangement because with it the gear cases 4 need extend no further to the rear than is necessary to support the reel 6 and the brackets 25 as shown in the drawings. Also I prefer carrying the connection 15 by the arcuately adjustable brackets 25 rather than by brackets 10, since this relieves the pivots 11 and the adjustment 12, 13 of the need of carrying the load of the rear ends of the gear cases, reel, etc. As before indicated the connection 15 can be carried by a cross member extending from one of the brackets 25 to the other. Also the skid or ground plate 9 may serve as such a cross member. This connection 15 is made to the ground plate 9 in the present instance, and the latter is attached to the brackets 25 as mentioned before.

It will now be observed that with the arrangement described, mowers and mower units adapted to cut, and cut efficiently, at substantially any heights above the ground desired within the range permitted by the diameters of the ground wheels 5a employed, can be constructed from a single lot of gear cases, gear case covers, brackets, etc., provided the permissible angular adjustment of the bed knife 8 (e. g. as established by the length of the arcuate slot 28 and the placement of the bolts 29) is such as to permit the placement of the edge of the knife 8 in positions respectively proper for the highest cut and for the lowest cut. In other words, to assemble from a set of such parts a machine intended to cut grass at any certain distance above the ground within the permissible limits, it is only neccessary to place the reel 6 at the desired distance above the ground, for example by a suitable length or setting of rod 14, and to place the brackets 25 in such angular positions around the axis 7 that the knife 8 is located in the proper position with respect to the vertical plane that passes through the axis 7 when the reel is at that elevation. Preferably I place the edge of the knife 8 substantially at this plane for all heights of cut, as indicated in Figs. 1 and 2. Also the user of a machine assembled from such parts can adjust it for various heights of cut from time to time provided the height of the reel is made adjustable, for example by providing the rod 14 with a number of appropriately placed holes 16. All that is necessary then to change the height of cut is to change the height of the reel above the ground appropriately, for example by shifting the position of the rod 14, and change the position of the knife 8 accordingly, for example as permitted by the brackets 25, their arcuate slots 28 and the removable bolts 29. To permit the fullest use of the machine, so far as concerns heights of cuts, the mechanism which holds the reel elevated, e. g. rod 14, should be adjustable from the highest to the lowest positions of cutting permitted by the extent of angular adjustment given to the brackets 25, and if cuts at intermediate heights are desired also, the brackets 25 and the mechanism which holds the reel elevated should be mutually adjustable to the desired intermediate heights of cut. However the reel-elevating mechanism, e. g. the hanger 14, may have a greater number of steps in its range of adjustment than the arcuate adjustment for the knife, because a single knife setting is suitable for a small range of height adjustments as is well known.

As before indicated the brackets 25 can be made adjustable around the reel axis in various ways. Fig. 3 illustrates another form of such adjustment, and also illustrates that the rollers frequently used to hold gear cases and reels elevated can be used for the same purpose with my invention. In that figure the gear casing 4, reel 6 having its axis at 7, and the bed knife 8, knife brackets 10, and nuts 12 for radial adjustment of the knife 8 will be recognized. An angularly adjustable bracket 125 adjacent each gear casing 4, carries the local bracket 10 and nut 12 in the same manner as brackets 25. The rear end of each gear case 4 has an arcuate face or flange 130 and each bracket 125 in the present instance has a cooperating arcuate flange 50, the two bearing face to face against each other. Each is provided with two or more cooperating bolt holes 51 through which threaded bolts 52 can join the two together (i. e. flange 125 and gear case body, or flange 125 and flange 130). Further, the various holes 51 are so placed in each of the two members, relatively, that they can be bolted together with the respective bracket 125 occupying any one of a number of angular positions around the reel axis 7. The angular adjustability of the brackets 125, and its effect, are like those of brackets 25, except that the adjustment is by definite steps. A projecting annular flange 53 may be placed on the face of each gear casing to cooperate with the edge of the adjacent bracket flange 50 to give added strength to the device.

A roller 56 is mounted on two bars 57 which are slidable in ways 58 in, respectively, the two brackets 125. Each bar 57 is provided with a number of holes 59 into which a bolt 60 in each bracket 125 can pass. The roller 56 runs on the ground in operation, and thus supports the reel 6 and the rear ends of the gear casings 4, and is capable of holding them at different elevations depending on the particular holes 59 into which the bolts 60 are placed. The roller arrangement is quite like that used commonly heretofore except for the brackets 125 and except that the bars 57 are materially longer and the holes 59 extend farther along each bar 57 than heretofore as will be understood from matters above.

It will be understood that my invention is not limited to the form of mower illustrated and described herein, but as indicated above is applicable as well to other forms of mowers having rotating reels and cooperating cutting knives. It will be understood also that this invention is not limited to the details of construction and operation described above and shown in the accompanying drawings in connection with matters of the invention except as appears hereafter in the claims.

I claim:

1. A heavy duty mower of the type comprising a generally horizontal draft frame and a pair of ground wheels connected thereto, wherein: a side member is mounted rotatably on the axis of rotation of each wheel adjacent thereto, a fly-knife reel is mounted between the side members on an axis spaced from and parallel to the wheel axis, a bracket is mounted on each side member rotatably about the reel axis, each side member and respective bracket being provided with a broad face, the said broad faces being held in a selected position of juxtaposition by fastening means, a second bracket pivoted at one end to each of said brackets on an axis spaced from and parallel to the reel axis, a bed knife attached to the other end of said second bracket, a screw means acting on the intermediate portion of said member for movement of the bed-knife radially of the reel, a rod adjustably attached at one end to the frame of the mower and at the other end pivotally attached to the brackets for moving the side members, brackets, bed knife, and reel as a unit about the wheel axis for selecting the height of the reel above the ground.

2. The subject matter as recited in claim 1, wherein: a guard member is attached to and runs between said brackets for the protection of the blade surfaces.

EDMUND ROSSITER SAWTELLE.

REFERENCES CITED

The following references are of record in the file of this patent:

UNITED STATES PATENTS

| Number | Name | Date |
|---|---|---|
| 1,172,444 | Farmer | Feb. 22, 1916 |
| 1,354,169 | Coldwell | Sept. 28, 1920 |
| 1,654,767 | Vannette | Jan. 3, 1928 |
| 1,800,114 | Stokes | Apr. 7, 1931 |
| 1,935,013 | Burcke | Nov. 14, 1933 |
| 2,045,857 | Hunter | June 30, 1936 |
| 2,197,264 | Cooper | Apr. 16, 1940 |
| 2,340,849 | Wildeboor et al. | Feb. 8, 1944 |